United States Patent
Hoghoj et al.

(10) Patent No.: US 7,248,670 B2
(45) Date of Patent: Jul. 24, 2007

(54) OPTICAL UNIT AND ASSOCIATED METHOD

(75) Inventors: Peter Hoghoj, Saint Martin le Vinoux (FR); Aurélien Dariel, Saint-Nizier du Moucherotte (FR); Sergio Rodrigues, Voreppe (FR)

(73) Assignee: Xenocs (FR)

( * ) Notice: Subject to any disclaimer, the term of this patent is extended or adjusted under 35 U.S.C. 154(b) by 0 days.

(21) Appl. No.: 10/506,716

(22) PCT Filed: Jun. 19, 2003

(86) PCT No.: PCT/FR03/01896

§ 371 (c)(1),
(2), (4) Date: Sep. 7, 2004

(87) PCT Pub. No.: WO04/001770

PCT Pub. Date: Dec. 31, 2003

(65) Prior Publication Data

US 2005/0117239 A1    Jun. 2, 2005

(30) Foreign Application Priority Data

Jan. 21, 2003   (FR)   ................................. 03 00623
Jun. 19, 2003   (FR)   ................................. 02 07546

(51) Int. Cl.
    *G21K 1/06*   (2006.01)
(52) U.S. Cl. .................. 378/84; 378/85; 378/145
(58) Field of Classification Search ........ 359/558–576; 378/34, 84, 85, 119, 145
    See application file for complete search history.

(56) References Cited

U.S. PATENT DOCUMENTS

| 4,562,583 A | 12/1985 | Hoover et al. |
| 5,127,028 A | 6/1992 | Wittry |
| 5,142,561 A * | 8/1992 | Doumas ........................ 378/84 |
| 5,619,548 A | 4/1997 | Koppel |

(Continued)

FOREIGN PATENT DOCUMENTS

| EP | 0 115 892 B1 | 8/1984 |
| GB | 2217036 A * | 10/1989 |
| WO | WO-108162 | 2/2001 |
| WO | WO-02/103710 A2 | 12/2002 |

(Continued)

OTHER PUBLICATIONS

M. P. Ulmer, Production and performance of multilayer coated conic sections, Jul. 2001, SPIE, vol. 4496, p. 127-133.*

(Continued)

*Primary Examiner*—Edward J. Glick
*Assistant Examiner*—John M. Corbett
(74) *Attorney, Agent, or Firm*—Lerner, David, Littenberg, Krumholz & Mentlik, LLP

(57) ABSTRACT

The invention relates to an optical assembly with a laterally graded reflective multilayer whose reflecting surface reflects incident X-rays under low incidence angles to produce a two-dimensional optical effect. The reflecting surface comprises a single surface conformed along two curvatures corresponding to two different directions. The invention also relates to a manufacturing method of such an optical assembly. The method includes coating a substrate already having a curvature. The invention also relates to a device for generating and conditioning X-rays for applications for angle-dispersive X-ray reflectometry. The device includes the optical assembly connected to an X-ray source so that X-rays emitted by the source are conditioned along two dimensions so as to adapt the beam emitted by the source to the sample, with the X-rays having different angles of incidence on the sample under consideration.

43 Claims, 7 Drawing Sheets

U.S. PATENT DOCUMENTS

Figure 2:
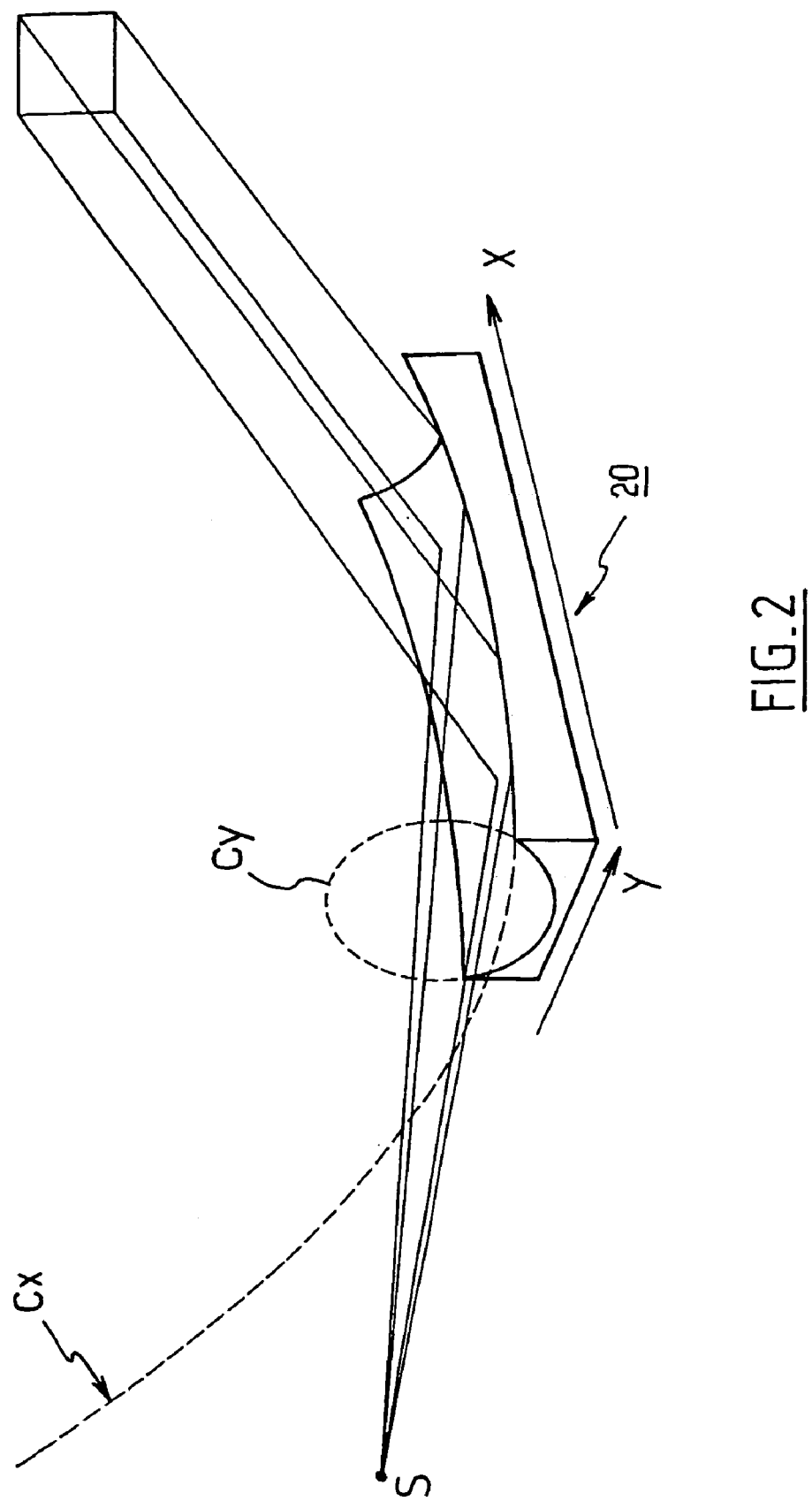

| | | | |
|---|---|---|---|
| 5,799,056 A * | 8/1998 | Gutman | 378/84 |
| 5,999,262 A | 12/1999 | Dobschal et al. | |
| 6,041,099 A | 3/2000 | Gutman et al. | |
| 6,226,349 B1 | 5/2001 | Schuster et al. | |
| 6,278,764 B1 | 8/2001 | Barbee, Jr. et al. | |
| 6,285,506 B1 * | 9/2001 | Chen | 359/642 |
| 6,317,483 B1 | 11/2001 | Chen | |
| 2004/0096034 A1 | 5/2004 | Michaelsen et al. | |

OTHER PUBLICATIONS

M. P. Ulmer, The Fabrication of Wolter I multilayer coated optics via electroforming: an update, Jul. 1999, SPIE, vol. 3773, p. 113-121.*

M. Schuster et al., Laterally Graded Multilayer Optics for X-ray Analysys, SPIE, vol. 3767, Jul. 1999, p. 183-198.*

Romaine et al., Multilayer Optics for Hard X-ray Astronomy, SPIE, vol. 4138, Nov. 2000, p. 120-125.*

Headrick et al., Multilayer Optics for a Wiggler Beamline (invited), Mar. 2002, Review of Scientific Instruments, vol. 43, No. 3, p. 1476-1479.*

Sasanuma et al., "A point-focusing small angle x-ray scattering camera using a doubly curved monochromator of a W/Si multilayer", Rev. Sci. Instrument, vol. 67, No. 3, pp. 688-692, Mar. 1, 1996.

Naudon et al., "New Apparatus for Grazing Reflectometry in the Angle-Resolved Dispersive Mode", J. Appl. Cryst, vol. 22, Part 5, pp. 460-464, Oct. 1, 1989.

G. E. Ice, "Microbeam Forming Methods for Synchrotron Radiation,"© 1997.

Ovonyx; Design News; "Focusing ring: first step toward scanning X-ray microscope," 13 pages.

Research & Development, Nov. 1988 by B. Volbert "New X-ray Spectrometer Technology Improves Both Speed and Accuracy," 8 pages.

Morawe Ch et al., entitled "Production of x-ray multilayer coatings by plasma sputtering" (Vide; Vide: Science, Technique Et Applications 1999 Soc Francaise Du Vide, France, vol. 4 (4), No. 294, 1999, pp. 467-472).

Ping Lee, entitled: "Uniform and graded multilayers as X-ray optical elements" (Applied Optics USA, vol. 22, No. 8, Apr. 15, 1983, pp. 1241-1246).

Kleineberg et al., "Bufferlayer and Caplayer Engineering of Mo/Si EUVL Multilayer Mirrors", Soft X-Ray and EUV Imaging Systems II, Daniel A. Tichenor, James A. Folta, Editors, Proceedings of SPIE, vol. 4506 (2001), pp. 113-120.

Niggemeier et al., "X-ray Reflectometer for the Diagnostics of Thin Films During Growth", Journal of Applied Crystallography (1997), 30, 905-908.

* cited by examiner

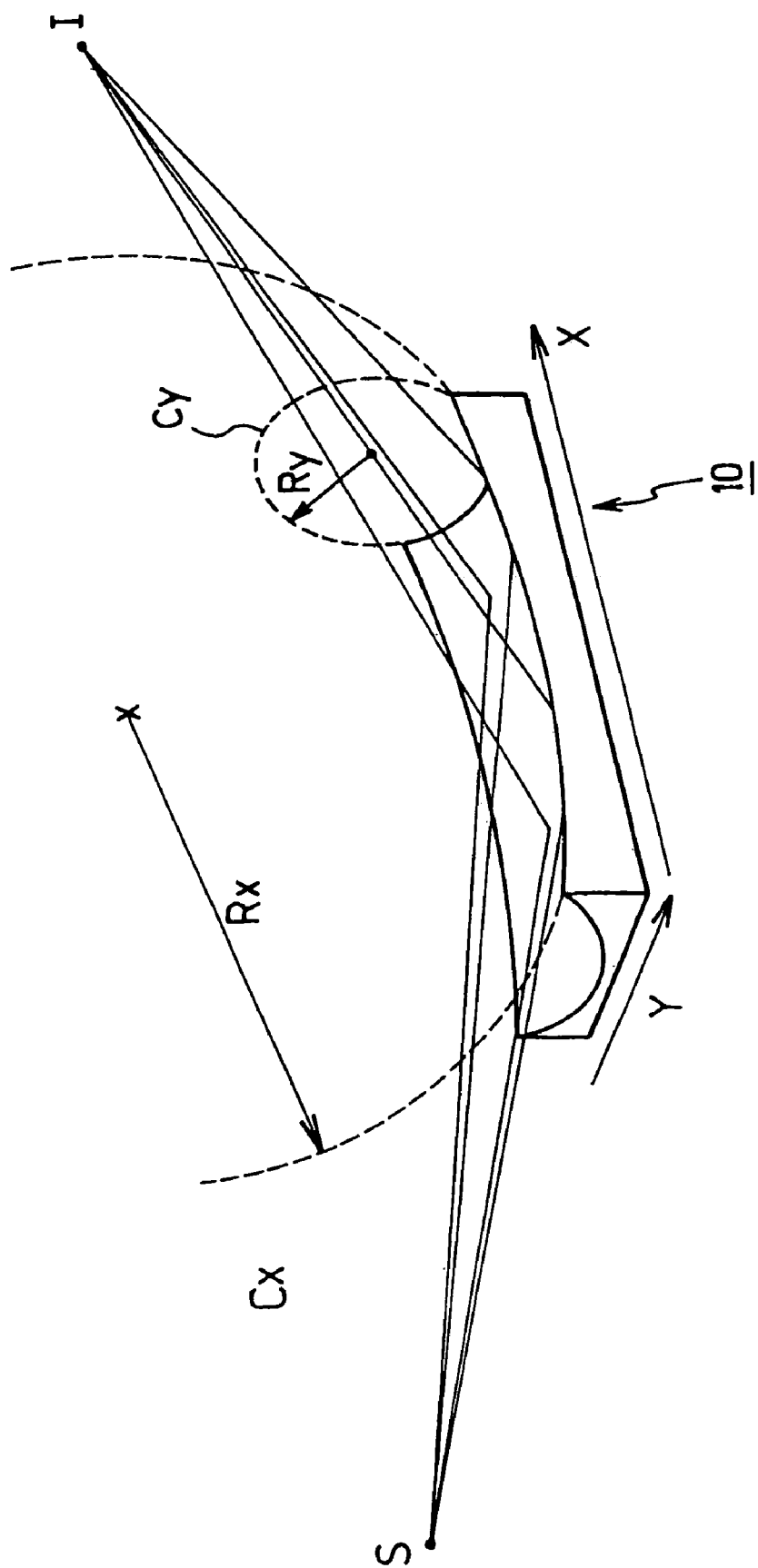
FIG_1

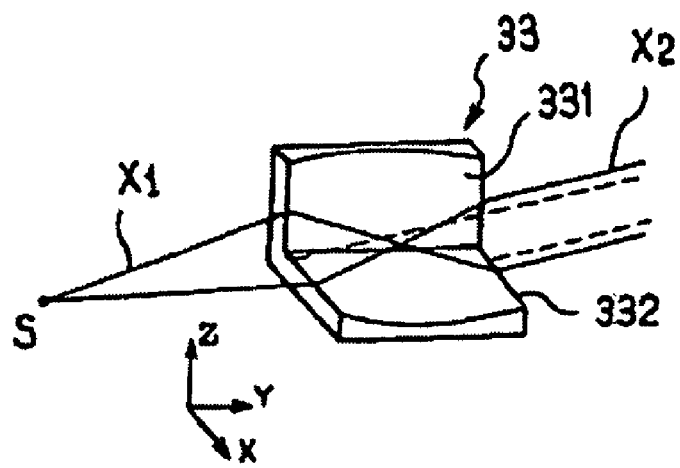
FIG_1a
(Prior Art)
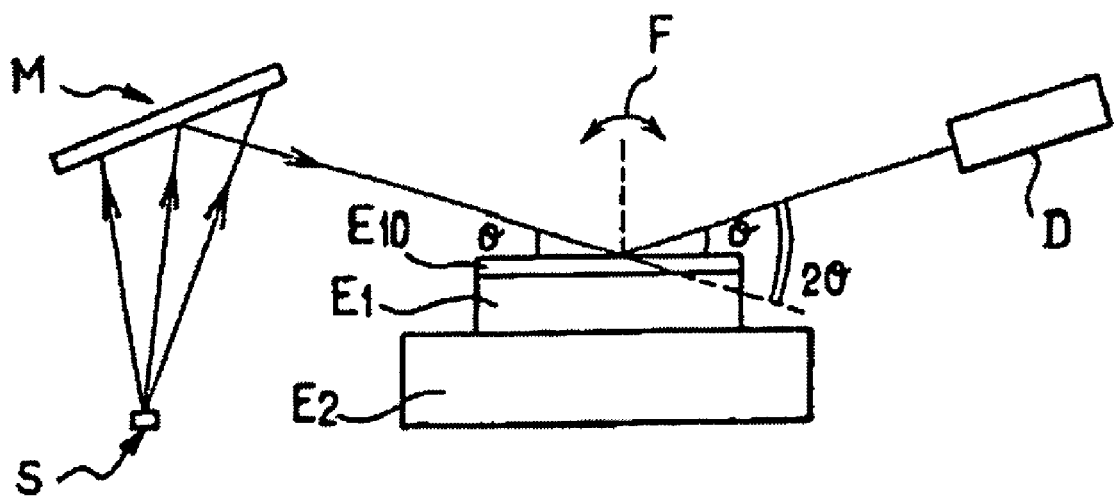
FIG_2a
(Prior Art)

OPTICAL UNIT AND ASSOCIATED METHOD

This application claims priority to PCT/FR03/01896, filed Jun. 19, 2003 which claims priority to FR0300623, filed Jan. 21, 2003 and to FR0207546, filed Jun. 19, 2002.

The present invention generally concerns the optical assemblies with laterally graded reflective multilayer, for reflecting X-rays under low incidence angles.

It is specified that <<low incidence angles>> refers to incidence angles lower than a value of about 10° (the angle of incidence being defined with respect to the reflecting surface).

More precisely, the invention concerns an optical assembly with a laterally graded reflective multilayer having a reflective surface for reflecting incident X-rays under low incidence angles, while producing a two-dimensional optical effect.

The invention also concerns a method for manufacturing such an optical assembly.

And the invention also concerns the generation and the conditioning of X-rays for applications of angle-dispersive X-ray reflectometry.

By <<two-dimensional optical effect>> is meant an optical effect using two different directions of space.

It can for example be a focalization on one point (from a point source), or a collimation of a beam whose rays are not parallel in any direction of space (e.g. a divergent conical beam).

And for producing such a two-dimensional effect, it is possible to combine two one-dimensional optical effects.

It is e.g. possible to focalize a divergent beam coming from a point source along a first direction (i.e. focalizing such a diverging beam on a line of focalization, and not on a single point), and also focalize the beam along a second direction, orthogonal to the first direction, in order to actually focalize the resulting beam onto a single image point.

As mentioned above, the invention finds an application in the generation and the conditioning of X-rays for applications of angle-dispersive X-ray reflectometry.

Other applications (which are non limitative) of the invention concern the generation of X-rays, analytical applications of X-rays such as diffraction, crystal diffraction, protein crystallography, texture analysis, thin film diffraction, stresses measurement, reflectometry, X-ray fluorescence.

It is specified that the definition of <<laterally graded>> shall be provided in this text.

Optical assemblies such as mentioned above are already known.

As an example U.S. Pat. No. 6,041,099 discloses multi-layer optical assemblies of the so-called Montel mirrors type—those being useable for modifying the optical characteristics of incident X-rays by creating a two-dimensional optical effect.

This type of optics is a variant of the so-called Kirkpatrick-Baez traditional optical scheme, which consists in aligning two mirrors which are not bound, the mirrors being curved along two orthogonal directions, in order to create a two-dimensional optical effect.

According to an evolution of this configuration, the optics disclosed in U.S. Pat. No. 6,041,099 are associated in a side-by-side configuration ("side-by-side Kirkpatrick-Baez device") and present a multilayer coating.

FIG. 1a represents such an optical assembly 33, which comprises two mirrors 331, 332 associated side by side, the surfaces of these two mirrors presenting curvatures which are centered on two axes which are orthogonal one relative to the other.

It is specified that in this text the figures which concern the state of the art are referenced with a <<a>> indicia.

A limitation of these KB side-by-side optical assemblies (the acronym KB being used in reference to the term Kirkpatrick-Baez) precisely derives from the fact that they are made of two distinct elements put side by side (two elementary mirrors having each a surface which is able to produce a one-dimensional optical effect, these two optical effects being superimposed in order to produce the desired two-dimensional optical effect).

It is indeed necessary to assemble these elementary mirrors with great precision, this corresponding to a delicate operation.

Moreover, in such optical assemblies the incident rays undergo two reflections in order to produce the two one-dimensional optical effects—a reflection on each elementary mirror—which generates losses in intensity.

A goal of the invention is to give access to optical assemblies such as mentioned in the introduction of this text, and which would not be associated to the limitations and drawbacks mentioned above.

Moreover, an aspect of the invention concerns the use of such optical assemblies for applications of angle-dispersive X-ray reflectometry.

In such application, an incident X-ray beam is conditioned on a sample to be analyzed in such a way that the incident X-rays have a range of incidence angles $\theta$ on the sample which is considered (at the level of the image area) of the order of a few degrees.

The analysis of the intensity of the reflected X-rays as a function of the incidence angle $\theta$ allows determining characteristics such as the thickness, the structure, the density or the interfacial roughness of a thin film of material present on the sample.

$R(\theta)$ measurements are thus carried out, where R is the measured reflectivity and $\theta$ the angle of incidence of X-rays arriving on the sample.

Such an application concerns among others the analysis of thin films for the microelectronics industry.

The technique of X-ray reflectometry is indeed then particularly efficient for the analysis of very thin films (typically lower than 50 nm), compared to so-called optical techniques such as e.g. ellipsometry (this technique being widespread in the semiconductor industry for the control of thickness and structure of dielectric materials).

It is known to carry out measurements of X-ray reflectometry by using different types of equipment, and according to different methods.

According to a first type of known method, the dispersion of the incidences of the rays of the beam coming onto the sample is obtained by moving mobile elements of the measurement device.

According to a first variant of this first type of method, $R(\theta)$ measurements are carried out by using an X-ray source and a planar monochromator, the angle dispersion being obtained by having the sample pivoting around an axis which is orthogonal to the surface of the sample and to the direction of the propagation of the X-rays.

An example of such a known configuration is represented in FIG. 2a.

This figure shows an X-ray source S whose flux of X-rays is directed onto a monochromator M.

A sample E1 is carried by a sample carrier E2.

The sample E1 has on its surface a thin film E10 for which characterization by reflectometry is sought.

The rays issued from the reflection on the monochromator are directed onto the sample. And after their reflection on the sample, an X-ray detector D shall receive the reflected rays and allow their analysis.

The arrow F shows the controlled displacements of the sample carrier and its sample.

In this known configuration, $R(\theta)$ measurements thus require the control of the displacement of mechanical elements of the device.

This naturally has a consequence on the duration of the measurement operations, as such displacements requiring great accuracy also require time.

According to a second variant of this first type of method, it is also known to carry out $R(\theta)$ measurements by keeping the sample unmoved, but by controlling the displacement of the X-ray source and of the detector which shall receive the rays after their reflection on the sample, the movements of the source and of the detector being controlled so as to be symmetrical with respect to the sample.

It shall be understood that in such case again, the displacements which are carried out significantly impact the duration of the acquisition of the measurements.

And these known techniques of carrying out $R(\theta)$ measurements are thus associated to relatively long operating times, which is in itself a limitation (e.g. for applications such as thin film analysis for the microelectronics industry).

According to a second known type of X-ray reflectometry methods, the incidence dispersion of the rays of the beam arriving onto the sample is obtained through an optical assembly which is able to produce a one-dimensional or a two-dimensional optical effect.

This second type of method is known as angle-dispersive X-ray reflectometry.

Figure 3:
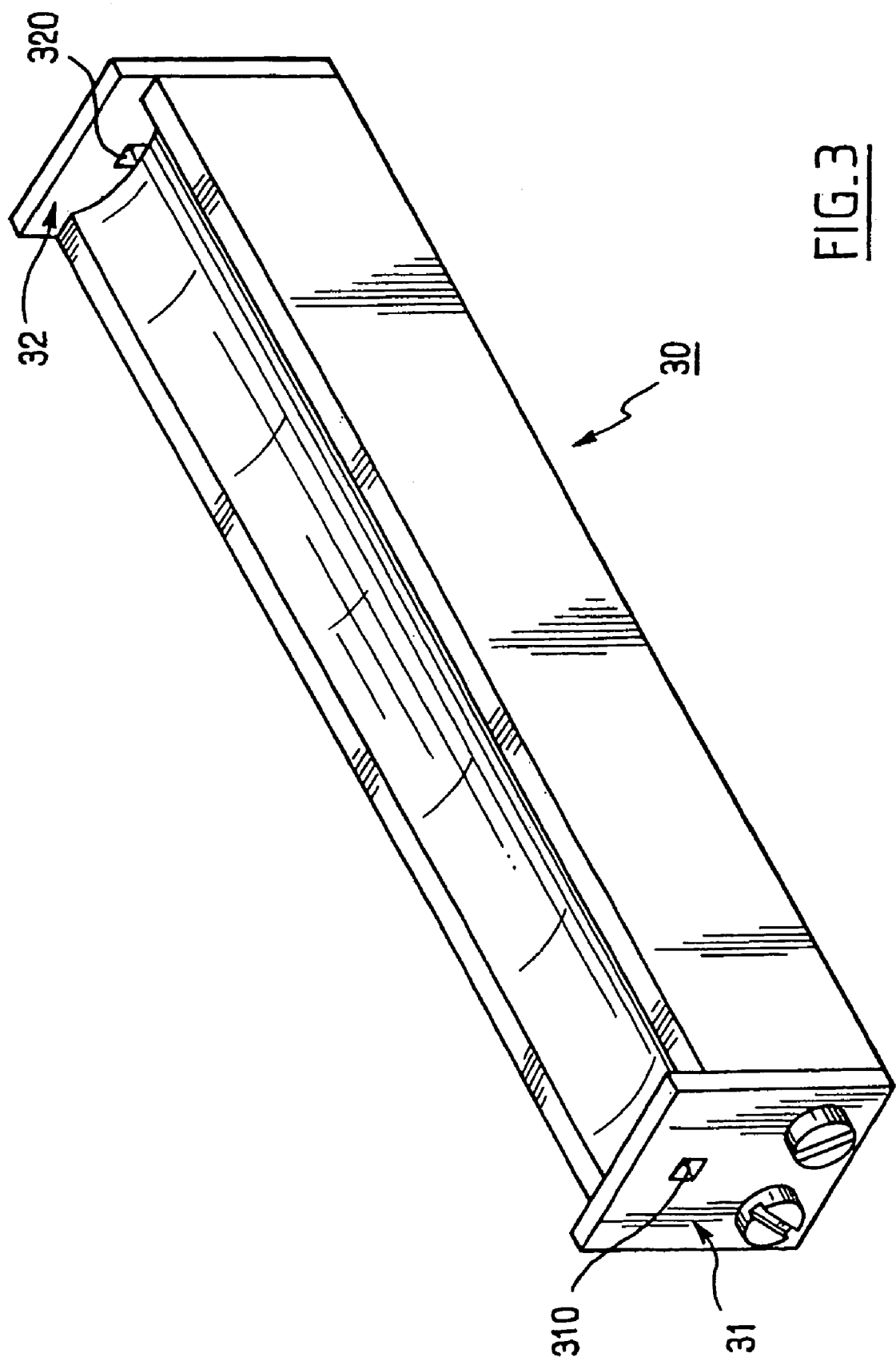
Figure 3A:
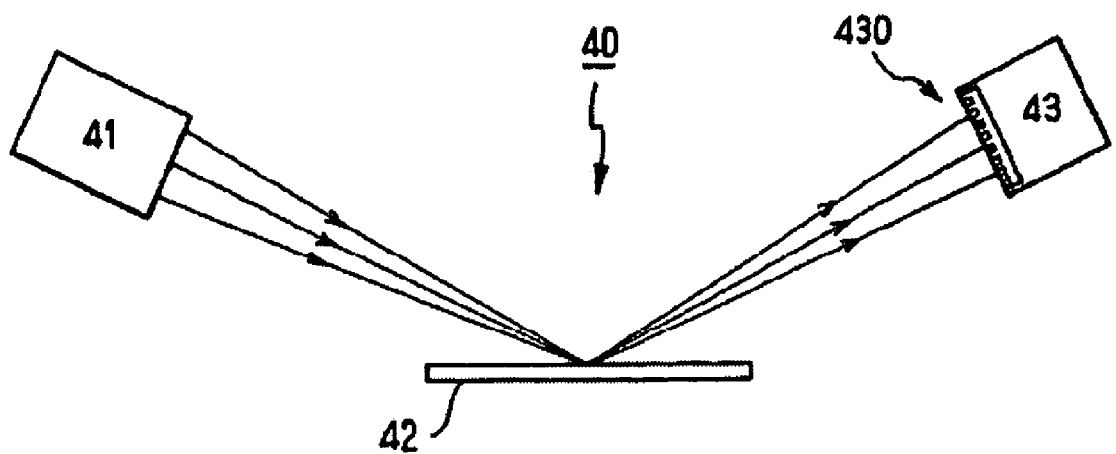

The principle of such method is shown in FIG. 3a where a one-dimensional view of a device 40 allowing to carry out angle-dispersive X-ray reflectometry measurements is presented.

This device 40 comprises:

Means 41 for generating and conditioning X-rays. These means comprise an X-ray source and an optical assembly for conditioning the beam of X-rays issued from said source, the optical assembly allowing conditioning in a desired manner a beam of X-rays which is to be directed on a sample 42, and an X-ray detector 43.

The conditioning carried out by the optical assembly of the means 41 corresponds to a controlled dispersion of the incidences of the X-ray beam directed onto the sample.

It is thus sought that the X-rays arrive onto the sample with an angular dispersion of a few degrees.

According to a preferred application of the invention, it is sought to obtain an angular dispersion of the order of 2° or more.

The reflected beam at the sample is then collected through the detector 43.

It is specified that the optical conditioning carried out by the optical assembly of the means 41 can correspond to a one-dimensional effect (e.g. focalization along only one dimension), or a two-dimensional optical effect.

Generally the detector 43 is of the PSD type ("Position Sensitive Detector") and comprises a sensor 430 of the CCD or photodiode type with a large number of pixels.

In the case of the invention and generally of two-dimensional optics, detector 43 can be a two-dimensional detector.

A two-dimensional detector allows to identify and to regroup pixels corresponding to identical values of incidence angles.

And this type of detector is of particular interest as pixels located at different horizontal positions (the horizontal direction being herein defined as the direction orthogonal to the plane of FIG. 3a) can correspond to identical angles of incidence.

Indeed a certain divergence along this second dimension (orthogonal to the plane of the figure) generates a weak variation of the angle of incidence of X-rays on the sample.

Divergences of the order of 1° can thus be tolerated along this second dimension in the case of the applications concerned by the invention.

This type of two-dimensional detector thus allows to advantageously use two-dimensional optics and particularly optics which allow an important flux to be collected along the two dimensions which is the case of the optical assembly of the invention.

In order to perform a two-dimensional conditioning of the beam for angle-dispersive X-ray reflectometry measurements, it is known according to a first variant to exploit the diffraction of the beam issued from an X-ray source from an optical assembly whose surface is a crystal curved along two dimensions.

Such crystals allow conditioning an initial beam through an X-ray diffraction phenomenon which takes place according to Bragg's law.

It is reminded that the Bragg condition for a crystal is of the form $n\lambda = 2d \sin \theta_B$, where n is the order of reflection, $\lambda$ the wavelength of the incident radiation for which the diffraction occurs, d the spacing period between the atomic planes of the crystal which are implied into the diffraction and $\theta_B$ the angle of incidence on these same atomic planes which is necessary for the diffraction to occur.

If one considers an X-ray incident beam, the rays having wavelengths $\lambda$, which hit the crystal with an angle of incidence $\theta_B$ well defined with respect to a certain family of atomic planes of the crystal shall be diffracted onto these same atomic planes if the Bragg condition here above reminded is met.

Thus crystals curved along two dimensions make it possible to produce a two-dimensional effect on the initial beam, in order to perform the conditioning sought.

This conditioning can thus correspond to a focalization along two different directions.

A particularity of crystals compared to multilayer coating is that it is difficult to apply on such crystals a gradient in order to increase the effective area of the crystal.

In this respect, reference can be made to:document "Approaching real X-ray optics", Hildebrandt et al., Rigaku Journal, Vol. 17 No. 1/2000, (pages 18 to 20 in particular).

This results in that a crystal is limited concerning the flux of diffracted X-rays, along the direction of the optical assembly formed by the crystal for which the angles of incidence of the incident rays on the crystal vary greatly (the collection surface is limited due to the absence of gradients).

This direction corresponds to the meridional direction of the optical assembly formed by the crystal.

According to a second variant of the method of angle-dispersive X-ray reflectometry consisting in performing a conditioning of a beam by an optical assembly producing a two-dimensional effect, it is also known to use the reflection of an initial beam coming from an X-ray source on an optical assembly of the "side-by-side" Kirkpatrick-Baez device: type, such as disclosed in U.S. Pat. No. 6,041,099.

Each one of the two mirrors of the KB device contains more preferably a laterally graded multilayer coating, allowing the initial beam X1 to be reflected according to Bragg's law.

We shall return to the definition of laterally graded multilayer.

These optical assemblies of the side-by-side KB type thus make it possible to condition an initial beam.

But as it will be shown in more detail further on in this text, such optical assemblies can be associated to relatively important dimensions.

This naturally constitutes a limitation in these known devices.

It thus appears that the known solutions in order to perform $R(\theta)$ measurements for applications for angle-dispersive X-ray reflectometry all contain limitations.

This is among others the case when the dispersion sought in angles of incidence on the sample is greater than 2° for focalization distances greater than 150 mm, and that the collected flux must be important (angular dispersion of about 1° along the direction that is transversal to the general direction of propagation of the rays).

Another goal of the invention is to make it possible to overcome these limitations.

So as to reach the above-mentioned goals, the invention proposes according to a first aspect an optical assembly with a laterally graded reflective multilayer whose reflecting surface is for reflecting incident X-rays under low incidence angles while producing a two-dimensional optical effect, characterized by the fact that said reflecting surface is comprised of a single surface, said reflecting surface being shaped according to two curvatures corresponding to two different directions.

Preferred aspects, but which are non limitative of such an optical assembly are the following:

the lateral gradient extends along the meridional direction of the incident X-rays, the reflecting surface is smooth, the two-dimensional optical effect is obtained by a single reflection of incident rays on the optical assembly, said different directions correspond respectively to the sagital direction and to the meridional direction of the incident X-rays, the multilayer is a depth-graded multilayer, said reflecting surface is adapted to reflect rays of Cu—Kα peaks, a first of said two curvatures defines a circle, a first of said two curvatures defines a curve different from a circle, a first of said two curvatures defines an ellipse or a parabola, a first of said two curvatures defines an open or closed curve different from a circle, an ellipse or a parabola, the second of said two curvatures defines a circle, the second of said two curvatures defines a curve different from a circle, the second of said two curvatures defines an ellipse or a parabola, the reflecting surface has a geometry of substantially toroidal shape, the reflecting surface has a geometry of substantially paraboloidal shape, the reflecting surface has a geometry of substantially ellipsoidal shape, the reflecting surface has a geometry substantially circular in shape along a first direction, and elliptic or parabolic along a second direction, the reflecting surface has a sagital curvature radius of less than 20 mm, a window that is opaque to X-rays and containing an aperture is associated at the input and/or output of the optical assembly, in order to control the input and/or output flux of the optical assembly, the windows are removable, the assembly comprises an aperture located at the input cross-section and the size and the shape of said aperture located at the input cross-section can be adjusted in order to control the incident flux, the assembly comprises an aperture located at the output cross-section and the size and the shape of said aperture located at the output cross-section can be adjusted in order to control the reflected flux, the apertures of the windows are dimensioned in order to realize a flux/divergence compromise of the radiation.

According to a second aspect, the invention also proposes a manufacturing method of an optical assembly according to one of the above aspects, characterized in that the method includes the coating of a substrate already having a curvature, and the curvature of this substrate along a second different direction.

Preferred aspects, but which are non limitative of this manufacturing method are the following:

the direction along which the substrate already has a curvature corresponds to the sagital direction of the optical assembly, said curvature of the substrate which corresponds to the sagital direction of the optical assembly defines a radius of curvature which is less than 20 mm, the direction along which the substrate is curved corresponds to the meridional direction of the optical assembly, said substrate has a roughness lower than 10 rms, the substrate itself is constituted, starting from an element in the form of a tube, cone, or pseudo-cone already having a curvature along a direction orthogonal to the axis of the tube, of the cone or of the pseudo-cone, the element is a glass tube with a circular transversal cross-section, the glass is of the Duran type (registered trademark), the constitution of the substrate includes the cutting of the tube along the longitudinal direction of the tube, in such a way as to obtain a substrate in the shape of an open cylinder, the cutting along the longitudinal direction of the tube is followed by cutting in order to dimension the optical assembly in length, the coating is performed in order to constitute a multilayer before curving the substrate, the substrate is curved in order to conform it to the geometry sought before coating it in order to constitute a multilayer, the optical assembly is coupled to a filter, in order to provide attenuation of the undesired spectral bands while guaranteeing sufficient transmission of a predetermined wavelength band for which reflecting the incident X-rays is sought, the filter is a 10-μm Nickel filter, the filter is realized by one of the following techniques:

realization of two filters whose combined thickness corresponds to the filter thickness sought, positioned respectively on the input and output windows of the radiation of a protective housing containing the optical assembly, deposit of a layer of filtering material on the multilayer coating, with a coating thickness that is approximately given by the following relationship: d=(e sin Θ)/2 (where e is the required filter "optical" thickness and θ the angle of incidence on the optic).

And according to a third aspect, the invention proposes a device for generating and conditioning X-rays for applications for angle-dispersive X-ray reflectometry including an optical assembly according to one of the above aspects connected to a source of X-rays in such a way that the X-rays emitted by the source are conditioned along two dimensions so as to adapt the beam emitted by the source in destination of a sample, the X-rays having different angles of incidences on the sample which is considered.

Preferred aspects, but which are non limitative of such a device are the following:

the dispersion of incidence angles on the sample corresponds substantially to the angular dispersion along the sagital dimension of the beam reflected by the optical assembly, the optics are directed with respect to the sample so that the normal at the center of the optical assembly is approximately parallel to the surface of the sample, the capture angle at the level of the sample is greater than 2° along a first dimension corresponding to the sagital dimension of the optical assembly and about 1° along a second dimension corresponding to the meridional dimension of the optical assembly, the optical assembly being positioned so that the dispersion of incidence angles of the X-rays on the sample is greater than 2°, the sample being placed at a distance greater than 15 cm in relation to the optical assembly.

Figure 4:
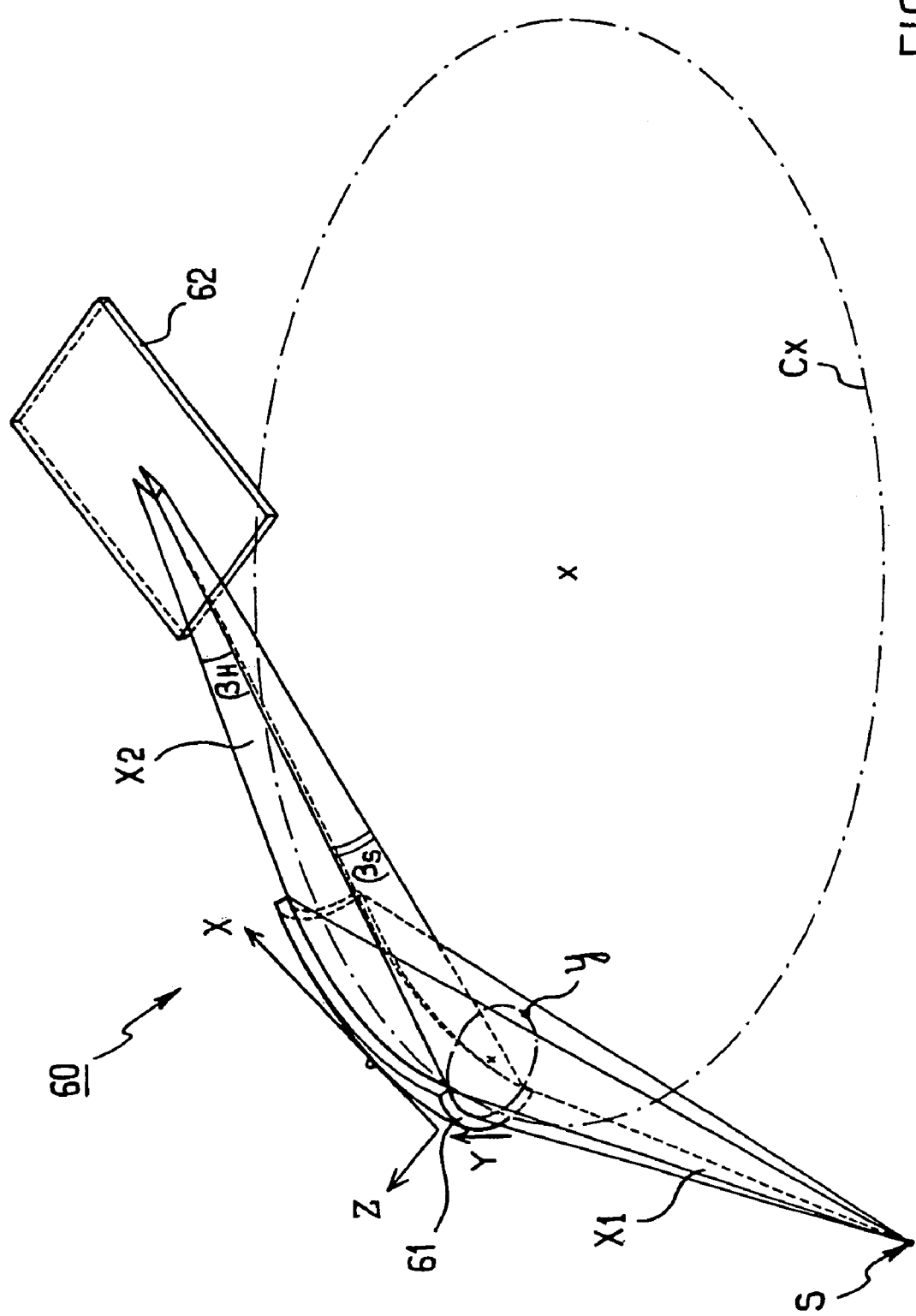
Figure 5A:
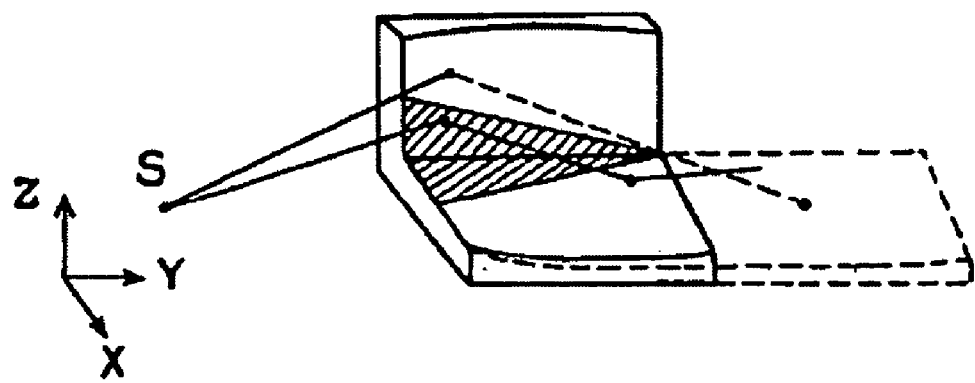
Figure 6A:
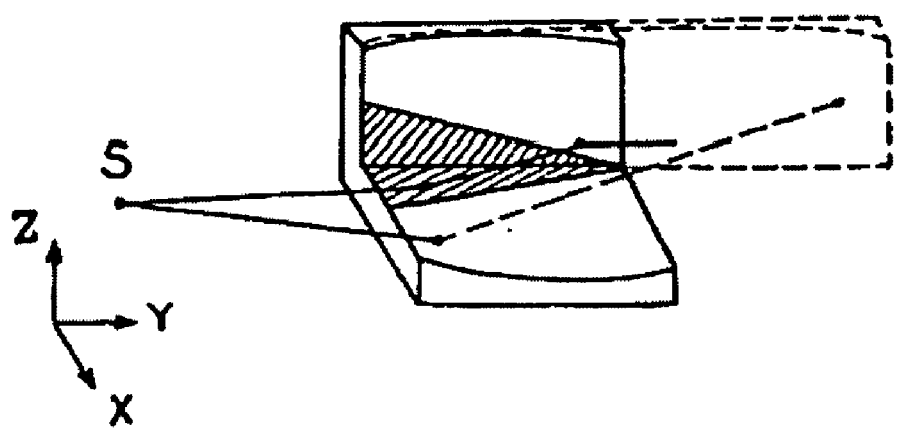

Other aspects, goals and advantages of the invention shall appear clearer after the following disclosure of preferred embodiments of the invention, reference being made to the annexed drawings in which, in addition to FIGS. 1a, 2a and 3a which have already been covered above:

FIG. 1 is a block representation of a first embodiment of an optical assembly according to the invention, allowing to perform a two-dimensional focalization of an incident beam of X-rays, FIG. 2 is an analogous view showing a second embodiment of an optical assembly according to the invention, allowing to perform a collimation of an incident beam of X-rays, FIG. 3 is an analogous view showing a third embodiment of an optical assembly according to the invention, wherein a low divergence of the reflected flux is sought, FIG. 4 is a block representation of an angle-dispersive X-ray reflectometry device according to the invention (with the X-ray detector not shown in this figure for reasons of clarity), FIGS. 5a and 6a highlight in a schematic manner the elongation constraints, associated with KB optical assemblies of a known type, which are required to increase the angular dispersion of the reflected beam along the directions that are transversal to the direction of propagation of the beam.

It is specified in the preamble of this disclosure that the figures are meant to show the principle of the invention, and do not necessarily show the dimensions and scales in a realistic manner.

This is true in particular for the angles of incidence (or even angles of reflection) of X-rays.

These X-rays arrive actually on the reflecting surfaces according to the invention with an incidence of less than 10°.

The meridional and sagital directions are also defined with respect to the general direction of propagation of the beam of X-rays:

The meridional direction corresponds to the average direction of propagation of this beam (and more precisely to the average direction between the average directions of propagation of the beam before and after its reflection on the optical assemblies to be described), The sagital direction corresponds to an horizontal direction that is transversal to this meridional direction (with the vertical here being defined as the average normal to the portion of the reflecting surface of the optical assemblies which shall be described and which is effectively used to reflect the incident beam of X-rays).

DISCLOSURE OF THE OPTICAL ASSEMBLY BEING CONSIDERED IN THE INVENTION

Now referring to FIG. 1, an optical assembly 10 designed to reflect incident X-rays coming from a source S of X-rays is shown.

Source S can be in particular of the X-ray tube, rotating anode, or micro-focus X-ray source type.

Optical assembly 10 includes a multilayer structure formed on a substrate (e.g. glass), that defines a reflecting surface for the incident X-rays.

The reflecting surface of this optical assembly has a particular geometry.

More precisely, this reflecting surface is shaped according to two curvatures corresponding to two different directions.

And this reflecting surface thus shows important differences with respect to reflecting surfaces of the type of those used in optical assemblies such as those covered in U.S. Pat. No. 6,041,099:

The reflecting surface is a single reflecting surface, in opposition to what is the case for optical assemblies in which two different elementary mirrors were put together, This reflecting surface is smooth (this term meaning in the present text that the reflecting surface does not present any second degree discontinuity (crests or angular points—salient or hollow—etc.), Moreover, a difference that is also important is that in the case of the invention, the incident rays only undergo a single reflection in order to produce the desired two-dimensional optical effect, while two reflections are required in the case of the optical assembly disclosed in U.S. Pat. No. 6,041,099.

Even more precisely, the reflecting surface of the optical assembly according to the invention has a curvature Rx in the meridional direction X, and a curvature Ry in the sagital direction Y.

FIG. 1 shows these curvature radiuses, two curves Cx and Cy being shown in order to show the appearance of the curves defined by the respective curvature radiuses Rx and Ry.

Each one of the two curvature radiuses can be constant, or vary along its associated curve.

Each one of curves Cx, Cy can thus be a circle, but also an ellipse, a parabola, or another curve (open or closed).

In any case, the reflecting surface of the optical assembly 10 does not have a simple spherical shape (i.e. the radiuses Rx and Ry are not simultaneously equal and constant).

Each one of curves Cx, Cy is thus associated to a different direction in space (two orthogonal directions on the example covered here).

And each one of these curves produces on the X-rays that are reflected on the reflecting surface a one-dimensional optical effect:

Curve Cx produces a one-dimensional optical effect along direction X,

Curve Cy produces a one-dimensional optical effect along direction Y.

And each one of these dimensional effects depends on the curvature associated with the curve, and on the evolution of said curvature along this curve.

Curves Cx and Cy can thus have their parameters set in order to selectively obtain associated one-dimensional effects such as one-dimensional collimation or focalization.

FIG. 1 shows the case in which each curve Cx, Cy produces a one-dimensional focalization.

To this end, Rx and Ry are different, but each one is constant (curves Cx and Cy are circles).

In this preferred embodiment, the reflecting surface of the optical assembly thus has a toroidal geometry.

This produces a two-dimensional focalization, which concentrates the divergent rays coming from source S to a single image point I.

And curvature radius Ry (sagital curvature radius) can have (in this embodiment as in the others) a value of less than 20 mm required for focalizations over short distances, less than 90 cm (source-focalization point distance) according to a preferred application of the invention. We shall return to this aspect.

One will note that the optical assembly according to the invention makes it possible to overcome the drawbacks mentioned in the introduction of this text concerning mirrors of the multilayer coating <<Montel>> type.

In particular, as has already been mentioned above, this optical assembly is in a single piece (it does not require delicate assembly).

And the incident X-rays only undergo a single reflection on its reflecting surface.

Furthermore, the reflecting surface is single and smooth.

It has been stated that the reflecting surface of optical assembly 10 was defined by a multilayer.

This multilayer (as with all the multilayers covered in this text) includes a minimum of one <<lateral gradient>>.

This characteristic makes it possible to efficiently reflect X-rays that present different local incidences with respect to the reflecting surface.

It shall be understood indeed that the different areas of the reflecting surface do not receive the incident X-rays with the same local incidence (due to the divergence of the incident beam, and to the geometry of this reflecting surface).

By laterally graded multilayer is meant here a multilayer whose layer structure is adapted so that the Bragg condition is respected at all points of the effective area of the mirror.

It is reminded that the Bragg condition is of the form $n\lambda = 2d^*\sin\theta$, with:

n: order of reflection, $\lambda$: wavelength of the incident radiation, d: period of the multilayer, $\theta$: angle of incidence on the surface of the multilayer.

Thus, for radiation of incident X-rays along a narrow wavelength band containing copper $K\alpha$ lines for example (Cu—$K\alpha$ peaks of wavelengths of approximately 0.154 nm), the laterally graded multilayer mirror allows the Bragg conditions to be maintained across the entire effective area of the mirror.

This causes the predetermined wavelength band to be reflected (in the above example containing the Copper $K\alpha$ peaks), by different regions of the mirror on which the incident rays have variable local angles of incidence.

Thus the surface of the mirror that is effectively used can be increased.

The gradient is obtained by varying the period of the multilayer locally, in an adapted manner.

This type of laterally graded multilayer structure thus allows the solid collection angle of the optical assembly to be increased, leading to a reflected flux that is higher with respect to monolayer mirrors operating by total reflection, for an identical optical geometry.

The presence of a lateral gradient also makes it possible to overcome the limits of certain known configurations, such as configurations using the Rowland circle for which the distance between the source and the optics and the distance between the optics and the sample are identical, and the variations in angle of incidence on the optics can be slight for optics of small size.

Indeed, configurations using the Rowland circle allow gradientless optics to be used but have the limitation of not being able to perform an enlargement or reduction of the image area in relation to the source (a reduction in the image area compared to the source can be considered through the usage of slits, but this mean is not very accurate and limits the collected flux).

An illustration of this type of known configuration can be found in document <<A point-focusing small-angle x-ray scattering camera using a doubly curved monochromator of a W/Si multilayer>> by Sasanuma and al. (Review of Scientific Instruments, American Institute of Physics, New York vol. 67 No. 3, Mar. 1, 1996 (pages 688–692)).

It is specified that the multilayer of the different embodiments of the invention can also present a depth gradient (gradient in the thickness of the multilayer).

Such a depth gradient allows the Bragg conditions to be fulfilled for fixed angles of incidence and variable wavelengths, or vice-versa.

It is thus possible for example to increase the width of the pass band in wavelength of the multilayer of the optical assembly, and to focus or collimate X-rays of different wavelengths, at the level of a same given image plane (case of a fixed geometry—i.e. a configuration wherein the relative positions of the source of the incident rays, of the optical assembly and of the image plane are fixed).

Sources of X-rays with different wavelengths can in this way be used to reflect the X-rays coming from the different sources with the same optical assembly, without requiring the source and/or the images plane(s) to be positioned again in relation to the optical assembly.

In this case the wavelength tolerance of the optical assembly is used (tolerance in $\Delta\lambda$).

In the same way, it is also possible to translate this tolerance in $\Delta\lambda$ into a tolerance in $\Delta\theta$.

A tolerance on the wavelength corresponding indeed—within the framework of the Bragg condition—to a tolerance on the angle of incidence, it is possible at a constant wavelength for the incident beam to collect and to reflect an incident luminous flux whose rays of the same wavelength have different local incidences.

In particular, X-ray sources of a larger dimension can in this way be used (increase in the angular acceptance).

Referring now to FIG. 2, another preferred embodiment of the invention is shown, illustrated by optical assembly 20.

The reflecting surface of the multilayer of this optical assembly is shaped in the respective directions X and Y along two curves Cx and Cy respectively parabolic and circular, each one of these curves producing a collimation along its associated X or Y direction.

A parallel collimation along all the directions in space is thus generated from the divergent incident beam.

And it is thus possible to realize according to the invention optical assemblies comprised of a multilayer mirror (laterally graded, and possibly furthermore with a depth gradient), whose reflecting surface can have one from among any different aspheric complex shapes.

It is thus possible in particular to give this reflecting surface one of the following geometries:
 geometry of substantially toroidal shape,
 geometry of substantially paraboloidal shape,
 geometry of substantially ellipsoidal shape,
 geometry of substantially circular shape along a first direction (the sagital direction in particular), and elliptic or parabolic along a second direction (the meridional direction in particular).

The lateral gradient can in particular extend along the meridional direction of the incident X-rays.

And the period of the multilayer can be adapted in order to reflect in particular the rays of the Cu—Kα peaks.

Referring now to FIG. 3, an optical assembly 30 according to the invention is shown, equipped with two end walls 31 and 32, positioned respectively at the input cross-section and at the output cross-section of the radiation that must be reflected by this optical assembly.

Each wall 31, 32 has an aperture (respectively 310, 320) allowing the X-ray radiation to pass, with the walls themselves being opaque to X-rays.

The walls can be made of lead, for example.

And it is possible to adjust the shape and the size of each aperture (independently of the other aperture), in order to control the incident flux (via the aperture located on the input cross-section), and the reflected radiation (via the aperture located on the output cross-section).

The apertures can thus be dimensioned, in order to find a compromise between the intensity of the flux (as input or output), and its divergence.

It is specified that walls 31 and 32 can be designed to be removable, for example being screwed onto the horizontal transversal edges of the optical assembly, as shown in FIG. 3.

In this way, optical assemblies can be adapted in a flexible manner in order to find if needed a desired flux/divergence compromise.

It is also possible to consider solely an input wall, or an output wall.

And each wall associated to its aperture thus constitutes a <<window>> allowing the X-rays to pass.

DISCLOSURE OF A PREFERRED MANUFACTURING METHOD

A preferred method shall now be described, allowing an optical assembly of the type disclosed above to be obtained, while obtaining the following advantages:
 guarantee a very good surface condition of the substrate used to perform the multilayer coating (the surface roughness specifications for substrates of X-ray multilayer mirrors correspond normally to degrees of roughness that must not exceed a maximum value of about 10 angstroms rms (root mean square)), and
 while also allowing surfaces to be constituted along an extremely reduced sagital curvature radius Ry, of a value for example that is less than 20 mm (making focalization possible for example along a source—focalization point distance of less than 90 cm).

Indeed, it would be difficult to obtain a substrate surface for the coating of the multilayer having such radius curvature values and surface condition:
 by implementing the polishing of a substrate that already has such a low sagital curvature: in this case the polishing of the pre-shaped substrate is delicate,
 or by curving along the sagital curvature radius Ry a flat substrate that is already polished—in this case it would be difficult to obtain the low curvature radiuses sought (while such curvature radiuses allow the optical effects sought to be produced over short distances, and to thus reduce the space occupied by the optical assembly).

In the case of the manufacturing method according to the invention, the surface condition sought is obtained without any special treatment, by using in order to form the optical assembly a substrate that already has a curvature along a direction of curvature.

And the direction along which the substrate already has a curvature corresponds more preferably to the sagital direction of the optical assembly, once the latter has been manufactured and positioned with respect to the X-ray source (this direction being as it has already been mentioned defined with respect to the incident radiation, but being also possibly defined in relation to the optical assembly itself to the extent where the optical assembly is to be directed in a specific way with respect to the incident radiation).

Such a substrate has a face corresponding to the face of the optical assembly that shall carry the reflecting surface. This face of the substrate shall be called <<optical face>>.

Thus, generally according to the invention a substrate is used that already has a curvature (along a direction that shall be made to correspond more preferably to the sagital direction of the optical assembly), and this substrate is curved along a second direction which is different (corresponding more preferably to the meridional direction of the optical assembly).

A coating of the optical face of the substrate with a multilayer is also performed. This coating can be performed before the curving of the substrate, or after.

In any case, an optical assembly is obtained in this way.

By selecting a substrate having the desired curvature (in form and in values(s) of curvature radius (es)), and by curving it as desired, an optical assembly having the geometry sought can be obtained.

It is also possible to constitute the substrate itself, in particular using an element (in particular made of glass) such as a tube, cone, or even a pseudo-cone (which is defined here as a surface of revolution generated by the revolution along a curve such as an ellipse of a generating straight line that is oblique with respect to its axis of revolution and cuts the latter in space).

In the case of an element in the form of a tube, the tube can have a transversal cross-section which is circular, but also elliptic, or correspond to any closed curve.

And such an element can also be an open cylinder whose directrix is an open curve such as a parabola segment.

In any case, the starting element has a curvature along a direction corresponding more preferably to the sagital direction of the optical assembly for which manufacture is sought.

And this direction is orthogonal to the axis of the tube, of the cone or of the pseudo-cone.

In a preferred embodiment, such a substrate can in particular be obtained using a glass tube whose transversal cross-section is circular.

In this preferred embodiment, the substrate from which the optical assembly is to be manufactured and which has a curvature along a direction can be in particular obtained by:

cutting a glass tube having the sagital curvature radius sought, such as a glass tube of the Duran type (registered trademark) manufactured by the SCHOTT company, then coating the tube thus cut with successive coatings of material in order to constitute the multilayer on top.

Such a substrate shall then be curved along a direction (preferably meridionally), with the curvature sought, in order to obtain the optical assembly.

And it is specified that it is possible—in this embodiment as in the others—to first proceed with curving the element (here the cut tube), and with the coating afterwards.

It is specified that in all of the embodiments for implementing the method according to the invention, the multilayer thus made is a laterally graded multilayer (and possibly also with a vertical gradient).

Cutting the glass tube is performed along the longitudinal direction of the tube by performing a cross-section along a direction that is parallel to the axis of symmetry of the tube (and which may even include this axis in order to constitute a half-tube), so as to obtain a substrate in the form of an open cylinder.

The directrix of this open cylinder thus has in this preferred embodiment the shape of a portion of a circle—e.g. a half-circle.

This longitudinal cutting is followed by another cutting in order to dimension the optics in length.

After these cutting operations, a substrate has thus been constituted for the manufacture of an optical assembly according to the invention.

After having coated the substrate with the multilayer, the coated substrate is curved along the desired second direction, which corresponds to the meridional direction, in order to conform the surface of the multilayer according to the desired geometry.

Thus, in this preferred embodiment of the manufacturing method of the optical assembly according to the invention, a cylindrical substrate can be constituted with a directrix having approximately the shape of a portion of a circle, then the coating of such a substrate is performed, and the curving of this substrate along a direction that is not included in the plane of the directrix of the cylinder of said substrate (in particular along the direction of the generatrix of the cylinder).

The Applicant has observed that it was thus much easier to manufacture optical assemblies according to the invention, than by one of the above-mentioned techniques (coating of a substrate that is already entirely conformed to the geometry sought, or curvature along two directions of a planar multilayer).

And it is thus possible to obtain substrates, used afterwards for multilayer coating, with a very good surface condition (roughness not exceeding 10 angstroms rms), and low sagital curvature radiuses (less than 20 mm).

The optical effects can thus be obtained over short distances.

In the case of two one-dimensional focalizations, it is thus reminded that the characteristics of tangential (meridional) and sagital focalization are given by the following formulas, for a toroidal mirror:

tangential focalization: $1/p+1/q=2/(R_x \sin \theta)$ with p: source-mirror distance, q: mirror-focalization plane distance, $\theta$: Angle of incidence, sagital focalization: $1/p+1/q=2 \sin \theta/R_y$ (for focalization along two dimensions, the p and q distances are identical for the two formulas).

It is also possible as a variant to start with the same part of a cut tube in order to form a cylinder whose directrix is open, and to inverse the order of coating and of curving in the second direction in relation to what was disclosed above.

In this case, first the cylindrical substrate is curved, then coating is performed in order to constitute the multilayer on the thus conformed surface.

In any case, coating can be carried out with any type of material that allows reflective multilayers for X-rays to be performed.

And this coating can use any type of known method for this purpose, e.g. sputtering (possibly assisted by plasma) or another type of coating in a vacuum.

It is also specified that for applications that require a high degree of spectral purity, the optical assembly for reflecting X-rays can be connected to a filter manufactured using appropriate material and thickness, in order to provide attenuation of the undesired spectral bands while guaranteeing sufficient transmission of a predetermined wavelength band for which reflecting the incident X-rays is sought.

Thus for optics made with W/Si multilayer coatings to reflect the Copper K$\alpha$ peaks, a 10-$\mu$m Nickel filter can be used to attenuate the copper K$\beta$ peak (0.139 nm) by a factor of 8 while maintaining sufficient transmission for the K$\alpha$ peaks (greater than 60%).

This filtering function comes in addition to the "natural monochromatization" obtained using the multilayer and can thus make it possible for applications where spectral purity is a priority to increase the performance of the multilayer optics disclosed in the invention.

Concerning this aspect, two alternative embodiments of the filter are to be considered:

realization of two filters whose combined thickness corresponds to the filter thickness sought (e.g. two filters having the same thickness that is equal to half of the total thickness sought), positioned respectively on the input and output windows of the radiation of a protective housing containing the optical assembly, coating with a layer of material (used for filtering) on the multilayer coating. The optics surface is then comprised of a reflecting multilayer coating (laterally graded) and of a surface layer providing the function of a filter in order to increase the spectral purity of the reflected radiation. The thickness coated is thus given approximately by the following relationship: $d=(e \sin \theta)/2$ (where e is the required filter "optical" thickness and $\theta$ the angle of incidence on the optics).

DISCLOSURE OF A PARTICULAR APPLICATION MODE

An aspect of the invention is now going to be disclosed that concerns more particularly angle-dispersive X-ray reflectometry.

FIG. 4 shows a device 60 which allows measurements of the R($\theta$) type to be performed for this type of application.

More precisely, in this figure are shown:

A source S of X-rays, an optical assembly 61 for conditioning initial beam X1 issued from source S, and a sample 62.

The X-ray detector normally designed for detecting the rays coming from the reflection on the sample is not shown in this figure, for reasons of clarity.

In reference to FIG. 4, it is specified that the angular dispersions of reflected beam X2 on optical assembly 61 are not representative.

Indeed in FIG. 4, the angular dispersion ($\beta_M$) along the meridional direction appears greater than the angular dispersion along the sagital direction ($\beta_S$). This is not the case according to an advantageous alternative of the invention.

Device 60 contains a source S of X-rays that emits initial beam X1.

Initial beam X1 issued from the source is directed to optical assembly 61, whose reflecting surface is conformed along two curvatures corresponding to two different directions.

This optical assembly 61 is thus capable of producing on initial beam X1 a two-dimensional optical effect, in order to generate beam X2 which has a controlled angular dispersion.

Beam X2 is then directed to sample 62 for which characterization of reflectivity is sought, e.g. for applications such as mentioned at the beginning of this text concerning R($\theta$) type measurements.

The different elements of device 60 are fixed for all of the R($\theta$) measurements for a given analysis area on the sample.

And optical assembly 61 allows generation of beam X2 conditioned as desired according to a two-dimensional effect (which is typically a two-dimensional focalization).

More precisely, optical assembly 61 conditions beam X2 so as to obtain high convergence angle at the level of the sample, and in particular along a dimension corresponding to the sagital dimension of optical assembly 61 (i.e. direction Y in FIG. 4).

Even more precisely, according to an advantageous alternative of the invention:
the capture angle at the level of the sample (i.e. the convergence angle of the optic) is:
greater than 2° along a dimension (corresponding to the sagital dimension of the optic),
and about 1° along another dimension (corresponding to the meridional dimension of the optic),
and the dispersion of the angles of incidence of the rays of beam X2 on the sample is greater than 2°, the sample being placed at distances greater than 15 cm in relation to the optical assembly.

This is obtained in particular:
by the geometry of the surface of optical assembly 61,
by the positioning of this optical assembly in relation to sample 62: this positioning is defined so that the dispersion of the angles of incidence of the X-rays arriving on the sample is greater than 2°.

This device 60 allows quick measurements of angle-dispersive X-ray reflectometry to be taken, as it does not imply the displacement of any mechanical element.

It is indeed the optical assembly 61 that provides the angular dispersion of beam X2 by conditioning this beam so as to adapt it to the level of the sample so that the X-rays arriving on this sample have different angles of incidence at the level of the image area which is considered (focal point of optical assembly on the sample).

Optical assembly 61 thus has a single reflecting surface, this surface being curved along two dimensions with a first curvature along the sagital direction and a second curvature along the meridional direction.

FIG. 4 shows a more detailed illustration of this optical assembly.

It is in this case an optical assembly allowing focalization in two dimensions to be performed with a first curvature along direction Y (circular curvature CY) and a second curvature along direction X (circular curvature CX).

In this precise case, the optics thus have a toroidal shape.

Generally, optical assembly 61 can have a toroidal shape or an ellipsoidal shape in the case of a two-dimensional focalization.

Optical assembly 61 can also have a paraboloidal shape in the case of a two-dimensional collimation.

According to another variant, optical assembly 61 can also have a circular curvature along one dimension, by way of example along, the sagital direction, and a parabolic curvature along another dimension, by way of example along the meridional direction.

Optical assembly 61 has a laterally graded multilayer coating (i.e. along the meridional direction corresponding to direction X in FIG. 4).

Note that additional elements can be positioned upstream of optical assembly 61 (between source S and this optical assembly) such as for example slits in order to adjust the beam.

Optical assembly 61 has a large effective collection area, allowing a high convergence angle to be obtained at the level of the sample in particular along the sagital dimension of the optics.

By way of example, the effective collection area of optical assembly 61 can thus also have along the sagital direction a dimension of about 1 cm for focalization distances of about 200 mm. The dimension referred to above corresponds to the length of the straight line obtained by connecting the two end points of the effective collection area along the sagital direction.

Thus for an optical assembly having a curvature radius of about 7 mm (and focalizing the beam using a source placed at 40 cm) the effective collection area can correspond to a portion along the sagital dimension of approximately one quarter of a circle, i.e. about 1 cm, which corresponds to a capture angle at the level of the sample of about 3°.

According to an advantageous alternative of the invention, optical assembly 61 thus allows a capture angle to be obtained at the level of the sample which is:
greater than 2° along a first dimension of optical assembly 41 (corresponding to its sagital direction, i.e. direction Y in FIG. 4),
about 1° along a second dimension of optical assembly 61 (corresponding to its meridional direction, i.e. direction X in FIG. 4).

In such a configuration, the sample is positioned at focalization distances (distance between optical assembly 61 and the sample) that are greater than 150 mm.

By way of example, the focalization distances can be about 300 mm to 200 mm.

The orientation of optical assembly 61 shall thus be adapted in relation to the sample in such a way that the dispersion of angles of incidence of the X-rays on the sample is greater than 2°.

The orientation of optical assembly 61 is defined as the angular position of this optical assembly for a given rotation around its optical axis (axis parallel to the meridional direction).

A preferred positioning of the elements of the device consists in directing the optical assembly in such a way that the dispersion of angles of incidence on the sample corresponds substantially to the angular dispersion along the sagital dimension (direction Y in FIG. 4) of reflected beam X2 at the level of the optical assembly.

A preferred positioning thus consists in directing the optical assembly in such a way that the average normal to the effective area of the optical assembly (or the normal at the center of the optic) is approximately parallel to the surface of the sample.

For the field of application of the invention, the average incidences on the sample are low and in the case of very low incidences (average incidence of about 1°) the orientation of optical assembly 61 can be described as being such that:

the average normal of the optical assembly is approximately parallel to the surface of sample 62, the sagital direction of optical assembly 61 is approximately orthogonal to the surface of sample 62, the meridional direction of optical assembly 61 is approximately parallel to the surface of sample 62.

An illustration of this type of setup is shown in FIG. 6.

In any case according to a preferred application of the invention, optical assembly 61 shall not be directed in such a way that the average normal to the effective area of optical assembly 61 is approximately orthogonal to the surface of sample 62 if one considers a low incidence (the dispersion of angles of incidence on sample 62 would then correspond substantially to the angular dispersion of beam X2 along the meridional direction).

Along the second dimension of the optical assembly, i.e. the meridional direction, the optical assembly allows an important flux to be collected and according to a preferred application, the angular dispersion of reflected beam X2 is about 1° along this meridional direction (direction X in FIG. 4).

Optical assembly 61 thus allows a high dispersion of angle incidences to be obtained at the level of the sample while conditioning a maximum of flux at the level of the sample.

Note that compared to a configuration in which one would use as optical assembly producing a two-dimensional effect an optical assembly of the side-by-side KB type, the invention allows more compact devices to be realized.

Optical assembly 61 indeed allows for a given length (along the meridional direction) to obtain a bigger collection surface along the sagital direction than what would be obtained with a configuration using a conditioning via an optic of the KB type.

Thus, in the case of the invention the angular dispersion of the beam treated by the effective area of the optical assembly is greater along the sagital direction, and high angular dispersion on the sample is obtained.

As an example and in reference to FIGS. 5*a* and 6*a*, obtaining an equivalent angular dispersion with optical assemblies of the KB type would require the elongation of the optical assembly along direction Y.

In the case of optical elements of the KB type, any incident ray must indeed hit the optical assembly in a particular zone (corresponding to the hatched zones of the mirrors in FIGS. 5*a* and 6*a*) to undergo double reflection.

This therefore results in that for such a known type of optical element, the solid angle that can be collected is limited by the length of the optical assembly.

And this is true for horizontal transversal directions as well as for vertical transversal directions (respectively direction Z or direction X in FIGS. 5*a* and 6*a*).

In the case of the invention, it is therefore possible to increase the effective collection area along the sagital direction, without increasing the length of the device.

This is important among others in the case where it is desired to limit the amount of space occupied and therefore the size of the optics, as it is the case in the field of application of the invention.

By way of example, in the case where optical assembly 61 has a toroidal surface geometry, the effective collection area of the mirror along the sagital dimension can describe a portion such as a quarter or even a half-circle, corresponding to a capture angle at the level of the sample along the sagital dimension that is important.

The possibility for optical assembly 61 to increase the effective collection area along the sagital direction is due to the fact that the angle of incidence on the optics of the X-rays coming from a same point source varies very little along this direction (direction Y in FIG. 4).

The invention claimed is:

1. An optical assembly comprising a laterally graded reflective multilayer having a reflecting surface to reflect incident X-rays under low incidence angles while producing a two-dimensional optical effect, said reflecting surface comprising a single surface conformed along two curvatures corresponding to two different directions;

wherein said two different directions correspond respectively to sagital and meridional directions of the incident X-rays, and said reflecting surface has a sagital curvature radius of less than 20 mm.

2. The optical assembly of claim 1, wherein the laterally graded reflective multilayer extends along the meridional direction of the incident X-rays.

3. The optical assembly as claimed in claim 1 or 2, wherein the reflecting surface is smooth.

4. The optical assembly of claim 1, wherein the two-dimensional optical effect is obtained by a single reflection of incident rays on the optical assembly.

5. The optical assembly of claim 1, further comprising a substrate coated with said laterally graded reflective multilayer, said substrate having a roughness less than 10 angstroms rms.

6. The optical assembly of claim 1, wherein the multilayer is a depth graded multilayer.

7. The optical assembly of claim 1, wherein the reflecting surface is adapted to reflect rays of Cu-Kα peaks.

8. The optical assembly of claim 1, wherein a first one of said two curvatures defines a circle.

9. The optical assembly of claim 1, wherein a first one of said two curvatures defines a curve different from a circle.

10. The optical assembly of claim 9, wherein the first curvature defines an ellipse or a parabola.

11. The optical assembly of claim 1, wherein a first one of said two curvatures defines an open or a closed curve different from a circle, an ellipse or a parabola.

12. The optical assembly as in any one of claims 8, 9, 10 or 11, wherein a second one of said two curvatures defines a circle.

13. The optical assembly as in any one of claims 8, 9, 10 or 11, wherein a second one of said two curvatures defines a curve different from a circle.

14. The optical assembly of claim 13, wherein the second curvature defines an ellipse or a parabola.

15. The optical assembly as in any one of claims 8, 9, 10 or 11, wherein a second one of said two curvatures defines an open or a closed curve different from a circle, an ellipse or a parabola.

16. The optical assembly of claim 1, wherein the reflecting surface has a geometry of substantially toroidal shape.

17. The optical assembly of claim 1, wherein the reflecting surface has a geometry of substantially paraboloidal shape.

18. The optical assembly of claim 1, wherein the reflecting surface has a geometry of substantially ellipsoidal shape.

19. The optical assembly of claim 1, wherein the reflecting surface has a substantially circular geometry along a first direction and a substantially elliptic or parabolic geometry along a second direction.

20. The optical assembly of claim 1, further comprising at least one window that is opaque to X-rays, the at least one window having an aperture therein and being associated with an input or an output of the optical assembly in order to control a flux of the optical assembly.

21. The optical assembly of claim 20, wherein the at least one window is removable.

22. The optical assembly of claim 20, wherein the aperture is located at an input cross-section, and the size and the shape of said aperture can be adjusted in order to control an incident flux.

23. The optical assembly of claim 20, wherein the aperture is located at an output cross-section, and the size and the shape of said aperture can be adjusted in order to control a reflected flux.

24. The optical assembly as claimed in one of claims 20 or 21, wherein the aperture of the at least one window is dimensioned to realize a flux/divergence compromise of radiation.

25. A method of manufacturing an optical assembly comprising a laterally graded reflective multilayer having a reflecting surface to reflect incident X-rays under low incidence angles while producing a two-dimensional optical effect, said reflecting surface comprising a single surface conformed along two curvatures corresponding to two different directions, the method comprising:
providing a substrate having a curvature along a first direction;
coating the substrate; and
curving the substrate along a second direction different than the first direction;
wherein one of the first or second directions is a sagital direction of the incident X-rays, and the curvature of the substrate corresponding to the sagital direction defines a radius of curvature which is less than 20 mm.

26. The method of claim 25, wherein the first direction along which the substrate already has a curvature corresponds to the sagital direction of the optical assembly.

27. The method as claimed in one of claims 25 or 26, wherein the second direction along which the substrate is curved corresponds to a meridional direction of the optical assembly.

28. The method of claim 25, wherein the substrate has a roughness lower than 10 angstroms rms.

29. The method of claim 25, wherein providing the substrate comprises providing an element in the form of a tube, cone, or pseudo-cone already having a curvature along a direction orthogonal to the axis of the tube, of the cone or of the pseudo-cone.

30. The method of claim 29, wherein the element comprises a glass tube having a circular transversal cross-section.

31. The method of claim 30, wherein the glass is of a borosilicate glass 3.3 type.

32. The method of claim 30, further comprising cutting the glass tube along a longitudinal direction so that the substrate has a shape of an open cylinder.

33. The method of claim 32, further comprising cutting in order to dimension the optical assembly in length after cutting the glass tube along the longitudinal direction.

34. The method of claim 25, wherein coating the substrate is performed to achieve a multilayer before curving the substrate.

35. The method of claim 25, wherein the substrate is curved in order to conform it to a predetermined geometry before the coating step.

36. The method of claim 25, further comprising coupling the optical assembly to a filter to provide attenuation of undesired spectral bands while guaranteeing sufficient transmission of a predetermined wavelength band.

37. The method of claim 36, wherein the filter comprises a 10-µm nickel filter.

38. The method of claim 36, wherein the filter is fabricated by one of:
providing a pair of filters to obtain a combined thickness corresponding to a predetermined filter thickness, a first one of the pair of filters positioned on an input window and a second one of the pair of filters being positioned on an output window of a protective housing containing the optical assembly; or
depositing a layer of filtering material on the multilayer, the layer of filtering material having a coating thickness approximately given by the following relationship:

$$d = (e \sin \theta)/2,$$

wherein e is a required filter optical thickness and $\theta$ is an angle of incidence.

39. A device for generating and conditioning X-rays for angle-dispersive X-ray reflectometry, the device comprising:
an optical assembly comprising a laterally graded reflective multilayer having a reflecting surface to reflect incident X-rays under low incidence angles while producing a two-dimensional optical effect, said reflecting surface comprising a single surface conformed along two curvatures corresponding to two different directions, said two different directions corresponding to sagital and meridional directions of the incident X-rays, and said reflecting surface has a sagital curvature radius of less than 20 mm; and
a source of the incident X-rays coupled to the optical assembly so the incident X-rays are conditioned along two dimensions to adapt a beam emitted by the source in destination of a sample, with the X-rays having different angles of incidence on the sample.

40. The device of claim 39, wherein the dispersion of angle incidences on the sample corresponds substantially to an angular dispersion along a sagital dimension of the beam reflected by the optical assembly.

41. The device as claimed in one of claims 39 or 40, wherein the optical assembly is directed relative to the sample so that the normal in a center region of the optical assembly is approximately parallel to the surface of the sample.

42. The device of claim 39, wherein a capture angle at a level of the sample is greater than 2° along a first dimension corresponding to a sagital dimension of the optical assembly and about 1° along a second dimension corresponding to a meridional dimension of the optical assembly, the optical assembly being positioned so dispersion in angles of incidence of the X-rays on the sample is greater than 2°, the sample being positioned at least 15 cm from the optical assembly.

43. A device for generating and conditioning X-rays for analytical applications, the device comprising:

a X-ray source operable to emit an X-ray beam; and an optical assembly coupled to the X-ray source, the assembly comprising a laterally graded reflective multilayer having a reflecting surface to reflect incident X-rays of the X-ray beam under low incidence angles while producing a two-dimensional optical effect, the reflecting surface comprising a single surface conformed along two curvatures corresponding to two different directions;

wherein the two different directions correspond respectively to sagital and meridional directions of the incident X-rays, and the reflecting surface has a sagital curvature radius of less than 20 mm; and wherein the optical assembly is operable to focus the X-ray beam emitted by the X-ray source onto a focalization point having a distance less than 90 cm from the X-ray source.

* * * * *

UNITED STATES PATENT AND TRADEMARK OFFICE
CERTIFICATE OF CORRECTION

PATENT NO. : 7,248,670 B2 Page 1 of 1
APPLICATION NO. : 10/506716
DATED : July 24, 2007
INVENTOR(S) : Peter Hoghoj, Aurélien Dariel and Sergio Rodrigues It is certified that error appears in the above-identified patent and that said Letters Patent is hereby corrected as shown below:

Column 21, line 3, "a X-ray" should read --an X-ray--.

Signed and Sealed this

Fifth Day of August, 2008

JON W. DUDAS
*Director of the United States Patent and Trademark Office*